Patented Mar. 15, 1949

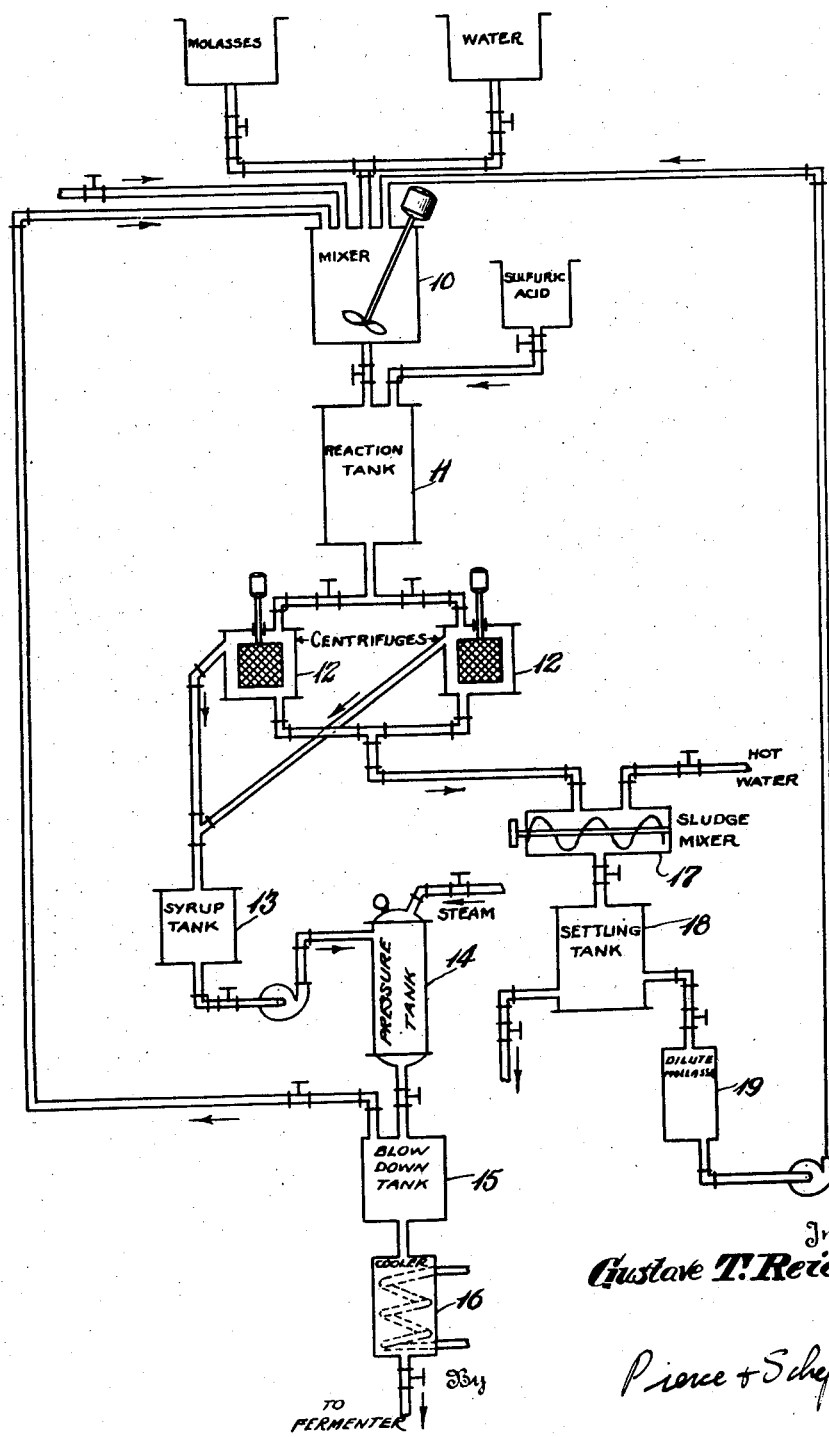

2,464,611

UNITED STATES PATENT OFFICE 2,464,611

TREATING FERMENTABLE MATERIALS

Gustave T. Reich, Philadelphia, Pa.

Application March 27, 1945, Serial No. 585,142

7 Claims. (Cl. 127—48)

This invention relates to a method of treating fermentable materials to improve the efficiency of fermentation and evaporation, and to improve the quality and yield of useful products from such materials.

In my patent application Serial No. 419,027, filed November 13, 1941, now Patent 2,448,051, part of the process consists of the removal of an alkaline earth compound such as lime from a saccharine material before fermentation. This prevents the scale formation in the stills and evaporators and likewise results in a purer yeast and carbon.

However, I have found that the removal of lime by this method has some disadvantages. At a temperature up to the boiling point of the diluted material, such as cane or beet molasses, sulphite waste liquors, fruit juices or any other fermentable material in which an alkaline earth compound is present, alkaline earth compounds have a tendency to precipitate especially during the fermentation or evaporation, when an acid such as sulfuric, phosphoric, citric and tartaric acid, or a salt, such as ammonium sulfate, phosphate, citrate, or tartrate is added. Thus, for instance, if cane molasses at 80° Brix is diluted with hot water to 25°–60° Brix at 160°–215° F. and sufficient sulfuric acid is added to have a pH of 3–6, gradually the lime present in the molasses will be converted into calcium sulfate. However, the reaction between the sulfuric acid and lime is not very rapid, owing to the buffer action of other compounds present in the molasses.

It has been found that at a pH of 3–6 at 160°–215° F., up to the boiling point of the diluted saccharine material, there is present not only suspended matter originally present in the raw material but, owing to the low pH and the decomposition of the organic matter which was combined with the lime, the liberated organic compounds become less soluble also and precipitate. Therefore, the precipitate may contain calcium sulfate, suspended matter originally present and also liberated organic matter, which is less soluble at such a low pH.

Owing to the slimy, gummy nature of this precipitate, the best method for the separation of the precipitate from the hot liquid is by centrifuging. Besides carbohydrates the organic matter in the precipitate contains compounds, part of which coagulate at a higher temperature while part becomes soluble at a higher temperature and some coagulate at a lower temperature, for instance, at 80°–100° F. Thus, there are three or more conditions which may increase or decrease the solubility according to the temperatures and pressures and time of reaction. I have found that upon centrifuging, especially when using a solid basket type centrifuge which may be operated batchwise or continuously, a great part of the finally precipitated organic compound is not completely removed from the liquid. If this saccharine solution, say at 25°–60° Brix at 180° F., is cooled to 80°–100° F. and diluted with water to a concentration of 18°–20° Brix, which is desirable for the alcoholic fermentation, the fine suspended or colloidal matter will envelope the yeast and upon its separation from the fermented saccharine solution, called beer, will cause a great deal of difficulty in the proper drying of the yeast. The material, if dried on drum dryers, will form a hard removable gummy layer upon the drums, preventing a thorough drying of the yeast and imparting a very high degree of hygroscopicity. It will also give the material a dark color, thereby making the product, from a marketing standpoint, not desirable. Furthermore, upon evaporation of the so-called clarified liquid, a hard film forms on the evaporator tubes.

Another very important point to be considered is that owing to the low pH and large quantity of free acid at the beginning of the reaction, for instance, one to three gallons of 60° Bé. $H_2SO_4$ per 1000 gallons of wort depending upon the quantity of lime present, the corrosion of the equipment is very great owing to the slow chemical reaction which takes place. I have found that at 160–200° F. iron containers can be used in the presence of such large quantities of acid, owing to the buffer action of the ingredients present in the saccharine material. This buffer action is very effective if a temperature, as stated above of 160°–200° F. is used, which is below the boiling point of the liquid.

After centrifuging, the calcium sulfate sludge is preferably treated with hot water to recover the fermentable material from it. There may be added, say, 100 gallons of hot water to 300 pounds of such calcium sulfate sludge, this mixture passed through a settler or recentrifuged and the recovered effluent returned for the dilution of new molasses. This effluent will contain a large percentage of organic matter either in suspended or colloidal state. The recycling of this organic matter has a detrimental influence upon the final yeast to be recovered on fermentation, as shown above.

Another important point to be considered is that upon centrifuging the saccharine material at a temperature, say of 160–200° F., while alkaline earth compounds and organic matter may be separated, in many instances the pasteurization is not complete. In fact, it has been found if batch centrifuging is applied to where the material accumulated on the basket which must be discharged intermittently, that contamination will take place. In order to insure an efficient fermentation, a saccharine liquid free of suspended matter and pasteurized, is desirable.

A typical apparatus arrangement suitable for practicing the invention is shown in the accompanying drawing. Referring to the drawing, an illustrative embodiment of the process of the invention as applied to a fermentable material such as molasses will be described.

The molasses partly diluted in mixer 10, say from 80° Brix to 25°–50° Brix, is treated with $H_2SO_4$ at 3–5 pH in reaction tank 11 and after standing or reacting for approximately one hour, so as to convert most of the lime into calcium sulfate, it is centrifuged in centrifuges 12. The liquid (normally containing quite a high percentage of very finely divided precipitate) which cools somewhat during the centrifuging, passes into the syrup tank 13.

As the process is continuous, a continuous heating under pressure is preferable but batch heating can be used where necessary. The calcium sulfate free material from which up to about 90% of calcium has been removed, depending upon the quality of saccharine material to be treated and the percentage of lime (CaO) present at time of reaction, is now pumped into the pressure heater 14. The pressure heater can be a heat exchanger or a tank, holding, say, 15–30 minutes or more capacity if the material is badly contaminated. It is heated by the introduction of live steam or heated indirectly up to, say, 50 pounds gauge pressure.

If, after centrifuging, the temperature is raised up to 300° F., 50 pounds gauge pressure, the saccharine material, freed of suspended $CaSO_4$, is pasteurized and also the suspended organic matter, formed below the boiling point of the liquid and which was not separated with the $CaSO_4$, is dissolved.

In this way there is obtained a clear liquid which upon dilution and cooling will not reprecipitate and will not contaminate the yeast with the organic matter which remained in suspension in the liquid after centrifuging, thus permitting an easy drying of the yeast.

The liquid from the pressure heater 14 is passed into blow-down tank 15, wherein the pressure is released and the steam set free is returned to mixer 10, thereby reducing the amount of steam required in the process. After passing through cooler 16, the liquid flows to the fermenters.

The calcium sulfate sludge from the centrifuges is mixed with hot water in mixer 17. The diluted sludge is settled in settling tank 18 and the clear liquid is drawn off to tank 19 whence it is pumped back to mixer 10 as required.

While a pH of, say, 3 to 5 is desired for an efficient calcium removal, for fermentation purposes the acidity is sometimes too high. Therefore, in some instances, it is desirable to separate the lime and then raise the pH, say to 5.5–6.5 by the use of a water-soluble neutralizing agent before or after pressure heating. The advantages of this procedure is that if neutralized before pressure heating but after separating $CaSO_4$, the liquid freed of most of its lime will have a pH at the heating temperature which has a less corrosive action upon the equipment and also insures the right conditions for carrying on the fermentation.

Sometimes it is desirable to pasteurize or concentrate the liquid; then the procedure will be as follows: Concentrate a dilute fermentable material, say to 25°–60° Brix, then treat with sulfuric acid or any organic or inorganic acid capable of forming insoluble calcium salts and proceed by any of the methods described above. However, instead of fermenting, the pH of the calcium sulfate precipitate free liquid may be raised with an alkaline salt either before, during or after concentration to the desired density which is desirable when fruit juices are treated.

It has been found that in the standard process the pasteurization of the partly diluted molasses, or, also fruit juices, in fact molasses direct if heated in shell and tube heaters, forms an incrustation owing to the presence of lime. This is true especially if the lime is present as calcium sulfate or as any slightly soluble calcium salt. According to the process of the invention, the removal of the lime from the hot liquid below the boiling point permits the use of any type of pasteurizer, without serious interference with the operation, owing to the avoidance of the formation of the hard calcium sulfate scale.

Some saccharine materials contain organic matter which at a 3–6.5 pH and concentration of 25°–50° Brix will precipitate. Upon centrifuging, the precipitated organic matter is removed with the calcium sulfate. If the precipitate is centrifuged and treated with hot water for the recovery of the saccharides from the calcium salts and suspended organic matter, the organic precipitate has a tendency to re-dissolve. In order to avoid this, either the precipitate is treated with cold water or its pH is raised. I have found that some alkali salts have a precipitating or dissolving action. For instance, sodium carbonate precipitates more organic matter in a hot solution than in a cold solution from a saccharine solution such as molasses, while sodium hydrate will dissolve the already precipitated organic matter instead of precipitating more. These characteristic properties can be utilized for the improvement of the calcium salt freed liquid.

While this process as specifically described relates to the utilization of the clarified saccharine material for the production of yeast and alcohol, it is obvious that the clarified liquid can be concentrated and utilized as such, or the product desired may be reversed by the recovery of calcium salts which can be of an organic nature or an inorganic acid. For instance, the removal of $CaSO_4$ from a phosphoric acid solution; the removal of calcium sulfate from a tartrate or citric acid solution. Any solution having a pH and concentration as defined above containing lime can be treated according to this process.

It has been found that some liquids, especially fermentable liquids high in calcium salts and insoluble at a pH of 3–6.5 and a concentration of 25°–60° Brix, will deposit a heavy scale upon the evaporator tubes when the above density has been reached. Therefore, in order to obtain an efficient evaporation and little scale formation, the liquid may be concentrated, if a quadruple effect evaporator system is being used, up to the third effect. Then the calcium salt is separated, the pH raised with an alkali hydrate or carbonate and the evaporation continued. Or, the pH of the liquid from the second effect, may be raised with $Na_2CO_3$, thereby precipitating more organic matter; the lime salt and increased organic precipitate may be separated by centrifuging or any suitable means and then continue the concentration then continued.

While the present process discusses the treatment of various fermentable liquids containing lime, it can also be used when other alkaline earth compounds such as strontium or magnesium are present.

I claim:

1. A method of treating liquid materials containing calcium compounds and fermentable organic compounds which comprises heating the materials to a temperature above 160° F. but not exceeding the boiling point in the presence of a precipitant for calcium compounds at a pH of 3 to 6, separating the precipitated calcium compound, and thereafter heating the liquid under pressure to a temperature substantially above the boiling point until suspended organic matter formed in the liquid in the prior operations is dissolved.

2. A method of treating liquid materials containing calcium compounds and fermentable organic compounds which comprises heating the materials to a temperature above 160° F. but not exceeding the boiling point in the presence of sulfuric acid at a pH of 3 to 6, separating the precipitated calcium compound, and thereafter heating the liquid under pressure to a temperature substantially above the boiling point until suspended organic matter formed in the liquid in the prior operations is dissolved.

3. A method of treating liquid materials containing calcium compounds and fermentable organic compounds which comprises heating the materials to a temperature above 160° F. but not exceeding the boiling point in the presence of a precipitant for calcium compounds at a pH of 3 to 6, separating the precipitated calcium compound, and thereafter heating the liquid under pressure to about 300° F.

4. A method of treating liquid materials containing calcium compounds and fermentable organic compounds which comprises heating the materials to a temperature above 160° F. but not exceeding the boiling point in the presence of sulfuric acid at a pH of 3 to 6, separating the precipitated calcium compound, and thereafter heating the liquid under pressure to about 300° F.

5. A method of treating liquid materials containing calcium compounds and fermentable organic compounds which comprises heating the materials to a temperature above 160° F. but not exceeding the boiling point in the presence of a precipitant for calcium compounds at a pH of 3 to 5, separating the precipitated calcium compound, and thereafter increasing the pH to 5.5 to 6.5 by the addition of an alkaline compound, heating the liquid under pressure to a temperature substantially above the boiling point.

6. A method of treating liquid materials containing calcium compounds and fermentable organic compounds which comprises heating the material to a temperature above 160° F. but not exceeding the boiling point in the presence of a precipitant for calcium at a pH of 3 to 5, separating the precipitated calcium compound and thereafter increasing the pH to 5.5 to 6.5 by the addition of an alkaline compound.

7. A method of treating liquid materials containing calcium compounds and fermentable organic compounds which comprises heating the material to a temperature above 160° F. but not exceeding the boiling point in the presence of a precipitant for calcium at a pH of 3 to 5, partially evaporating the water content of the material, separating the precipitated calcium compound and thereafter increasing the pH to 5.5 to 6.5 by the addition of an alkaline compound and continuing the evaporation of the material.

GUSTAVE T. REICH.

REFERENCES CITED

The following references are of record in the file of this patent:

UNITED STATES PATENTS

| Number | Name | Date |
|---|---|---|
| 1,362,078 | Bonner | Dec. 14, 1920 |
| 1,493,967 | Cutler | May 13, 1924 |
| 2,075,127 | Mead | Mar. 30, 1937 |

OTHER REFERENCES

Reich, "Molasses Elaboration," Am. Inst. of C. E., vol. 38, No. 6, December 25, 1942.